United States Patent
Thorpe (10) Patent No.: US 7,299,902 B2
(45) Date of Patent: Nov. 27, 2007

(54) WHEEL CHOCK FOR TANDEM WHEELED VEHICLES

(76) Inventor: Jim Thorpe, 3750 La Cruz Way, Paso Robles, CA (US) 93446

(*) Notice: Subject to any disclaimer, the term of this patent is extended or adjusted under 35 U.S.C. 154(b) by 0 days.

(21) Appl. No.: 11/256,557

(22) Filed: Oct. 21, 2005

(65) Prior Publication Data
US 2007/0089941 A1 Apr. 26, 2007

(51) Int. Cl.
*B61H 13/00* (2006.01)
(52) U.S. Cl. ........................................... 188/32
(58) Field of Classification Search ............... 188/4 R, 188/32; D12/217; 410/30, 49
See application file for complete search history.

(56) References Cited

U.S. PATENT DOCUMENTS

| | | | |
|---|---|---|---|
| 2,797,774 A | | 7/1957 | Eckhart |
| 2,822,063 A | * | 2/1958 | Hampton ...................... 188/32 |
| 2,954,101 A | | 9/1960 | Corson |
| 3,113,642 A | | 12/1963 | Lay |
| 3,493,083 A | * | 2/1970 | Lightowler .................. 188/32 |
| 3,695,394 A | | 10/1972 | Carpenter |
| 3,700,077 A | | 10/1972 | Harder |
| 3,845,844 A | | 11/1974 | Woerner |
| 3,993,167 A | | 11/1976 | Reed |
| 4,186,823 A | | 2/1980 | White, Jr. |
| 4,582,176 A | | 4/1986 | Roberts |
| 4,649,724 A | | 3/1987 | Raine |
| 4,694,936 A | | 9/1987 | Jackson |
| 4,711,325 A | * | 12/1987 | Mountz ........................ 188/32 |
| 4,715,480 A | | 12/1987 | Anderson |
| 4,804,070 A | * | 2/1989 | Bohler ......................... 188/32 |
| 4,828,076 A | * | 5/1989 | Fox .............................. 188/32 |
| 4,833,442 A | | 5/1989 | Von Heck |
| 4,934,489 A | | 6/1990 | Jackson |
| 5,137,121 A | | 8/1992 | Leonard |
| 5,158,158 A | | 10/1992 | Balogh |
| 5,368,134 A | | 11/1994 | Rickman |
| 5,381,680 A | | 1/1995 | Rauch, Jr. |
| 5,392,880 A | | 2/1995 | Christian |
| 5,410,897 A | | 5/1995 | Edmondson |
| 5,490,582 A | | 2/1996 | Trowbridge |
| 5,547,045 A | | 8/1996 | Stutzman |
| D385,526 S | * | 10/1997 | Hinkle ...................... D12/217 |
| 5,689,981 A | | 11/1997 | DeLuca |
| 5,769,186 A | | 6/1998 | Roberts |
| 6,116,062 A | | 9/2000 | Markegard |
| 6,390,245 B1 | | 5/2002 | Metz |
| 6,425,465 B1 | * | 7/2002 | Tallman et al. ............... 188/32 |
| 7,036,637 B1 | * | 5/2006 | Wiens ......................... 188/36 |
| 2004/0108172 A1 | * | 6/2004 | Fox ............................. 188/32 |

* cited by examiner

*Primary Examiner*—Christopher P. Schwartz
(74) *Attorney, Agent, or Firm*—Richard A. Ryan

(57) ABSTRACT

A wheel chock, for use with tandem wheeled vehicles, having a pair of generally wedged shaped block members in spaced apart relation that are interconnected by a linkage assembly. The linkage assembly is operatively connected to a handle so as to horizontally displace the block members relative to each other. The first end of each block member has an angled contact panel configured for frictional engagement with the wheels so as to prevent movement of the vehicle. The handle is operatively connected to a link member configured for over-center displacement and the link member is pivotally connected to a drive member. In the preferred embodiment, the wheel chock comprises a locking member configured to maintain the linkage assembly in the engaged condition. The first ends of the block members has a vertical panel and is configured at an angle that will not become easily stuck under the wheels.

18 Claims, 5 Drawing Sheets

WHEEL CHOCK FOR TANDEM WHEELED VEHICLES

CROSS-REFERENCE TO RELATED APPLICATIONS

None.

BACKGROUND OF THE INVENTION

A. Field of the Invention

The field of the present invention relates generally to vehicle wheel chocks used to prevent movement of a vehicle by releasably engaging one or more wheels of the vehicle. More particularly, the present invention relates to such wheel chocks that are configured for use with tandem wheeled vehicles, such as recreational vehicles, trucks, trailers or the like by frictionally engaging facing tire surfaces of adjacent wheels. Even more particularly, the present invention relates to such wheel chocks that utilize one or more horizontally displaceable wedged block members to prevent movement of the vehicle.

B. Background

Wheel chocks are apparatuses that are configured to generally engage one or more wheels of a vehicle to prevent movement of the vehicle after it has been placed in a parked condition. Tandem wheeled vehicles, such as recreational vehicles, trailers and larger trucks, have tandem axles and wheels which place pairs of adjacent wheels on each side of the vehicle that are spaced generally close to each other, typically two to twelve inches apart at the closest position of the pneumatic tire portion of the wheels. Most wheel chocks for these vehicles are configured to engage both of the adjacent wheels. With regard to recreational vehicles specifically, most of these types of vehicles have tandem wheels. It is commonly known that many people utilize recreational vehicles for camping, attending sporting events or other activities that generally result in the vehicle being placed in a parked condition and being used while parked. For purposes of this disclosure, recreational vehicles include those vehicles that are motorized, meaning they have a gasoline, diesel or other type of motor that drives the vehicle from one location to another, and those that must be towed behind another vehicle, such as a car or truck. Generally, when recreational vehicles are to be parked for any extended period of time, a wheel locking device is utilized to stabilize the vehicle so as to prevent undesirable and/or unauthorized movement of the vehicle. Without stabilization, the movement of persons inside the parked recreational vehicle will typically result in undesirable movement, such as a slight rocking motion, of the vehicle itself. If the vehicle is not parked on substantially level ground, it will tend to roll from its parked position. As a result, the use of wheel chocks to stabilize or immobilize a recreational vehicle is generally considered a necessity instead of a mere convenience. In addition to use for stabilization purposes, wheel chocks are also commonly utilized to prevent theft or other unauthorized movement of a vehicle.

Numerous different types of configurations of wheel chocks are commonly known in the prior art. Generally, all such apparatuses are configured to frictionally engage one or more tire surfaces (i.e., facing tire surfaces for tandem wheeled vehicles) to prevent movement of the vehicle by inhibiting rotation of the tire or tires. Perhaps the most common are those type that have one or more wedge members which are configured to be securely disposed between the supporting surface, such as the ground, paved surfaces, concrete driveways and the like, and the pneumatic tires of the vehicle's wheels. A basic configuration for this type of wheel chock is a single wedge-shaped member that both engages the vehicle's tire and the supporting surface. Some of these have wedges and supporting surface contact sides that are shaped and/or configured to improve the engagement with the tire or the supporting surface. Examples of such apparatuses are shown in U.S. Pat. No. 4,186,823 to White, Jr., U.S. Pat. No. 3,993,167 to Reed, U.S. Pat. No. 2,954,101 to Corson and U.S. Pat. No. 2,797,774 to Eckhart. Some wedge-shaped wheel chocks have a lever or handle mechanism that is configured to improve the engagement of the wheel chock with the tire and supporting surface. Examples of such apparatuses are shown in U.S. Pat. No. 6,390,245 to Metz and U.S. Pat. No. 5,137,121 to Leonard. Although the typical single block wedge only prevents movement of the vehicle in one direction, thereby requiring two such blocks to prevent both forward and backward movement of the vehicle, U.S. Pat. No. 4,582,176 to Roberts discloses a single wedge-shaped apparatus that is configured for use with dual or tandem wheeled trucks. Several prior art patents disclose wheel chocks for tandem wheeled vehicles that are configured with a pair of chock members that are interconnected by a pivoting arm member that the user steps on to force the arm downward and drive the chock members into engagement with the adjacent tires to prevent rotation thereof. Examples of such apparatuses are shown in U.S. Pat. No. 3,845,844 to Woerner and U.S. Pat. No. 3,700,077 to Harder.

Other wheel chocks utilize an operating mechanism which positions the wedge member or members tightly against the tires and in engaging relation with the supporting surface. With regard to tandem wheeled vehicles, these type of wheel chocks generally are configured to engage both tires of a set of adjacent wheels by positioning one wedge-shaped member at each tire in a manner that prevents both wheels from rotating. Typically, the user of the wheel chock places the apparatus between the adjacent tires and operates the mechanism to displace the opposing wedge-shaped members away from each other and into engagement with the adjacent tires. Examples of this type of wheel chock, namely the horizontally displaceable wedge-shaped block member type of wheel chock, are shown in U.S. Pat. No. 4,828,076 to Fox and U.S. Pat. No. 3,695,394 to Carpenter. The Fox patent describes a lock chock for tandem axle vehicles that utilizes a wing nut mounted on a threaded shaft that is turned to extend or retract a pair of blocks into or out of engagement with the adjacent tires. The Carpenter patent describes a locking wheel chock for tandem wheeled vehicles that requires the user to turn a nut in a turnbuckle to extend or retract a pair of block members into or out of engagement with the adjacent tires. A number of patents describe wheel chock apparatuses that have a pair of block members with a vertically disposed operating mechanism to move the blocks into or out of engagement with the tires from above and below the tires, as opposed to horizontally along the supporting surface. Examples of these apparatuses are disclosed in U.S. Pat. No. 5,158,158 to Balogh et. al and U.S. Pat. No. 4,694,936 to Jackson. A number of wheel chock apparatuses utilize separate pairs of engagement members above and below the tires to engage the tires and prevent movement thereof. Examples of these apparatuses are disclosed in U.S. Pat. No. 5,490,582 to Trowbridge, U.S. Pat. No. 4,934,489 to Jackson and U.S. Pat. No. 5,392,880 to Christian. U.S. Pat. No. 5,381,680 to Rauch, Jr. discloses a retractable wheel lock assembly which utilizes a single wedge-shaped member that engages a pair of adjacent wheels from above.

In general, the prior art devices tend to be too cumbersome and/or technically complicated for frequent use by the typical or average recreational vehicle owner or user or even those persons who drive trucks and/or haul trailers for a living. Another common problem with most of the prior art devices is the difficulty the user has is disengaging the chock locking apparatus from between the pair of wheels with which it was engaged. Besides often requiring a significant amount of brute force, many of the prior art apparatuses require the user to get in an awkward or uncomfortable position to disengage the apparatus from between the pair of wheels. As a result, despite the known safety and stabilizing benefits of wheel chocks, very often the user of the vehicle chooses not to utilize the wheel lock apparatuses. This is particularly true for those who are considered part time or weekend recreational vehicle users. Yet another limitation of many presently available wheel chocks is the inability of the apparatus to compensate for narrower or wider spacing between the adjacent tires of a tandem wheeled vehicle. Because of this problem, the manufacturer is required to somewhat narrowly select his or her market for the wheel chock or make a number of different sized wheel chocks to accommodate the differently configured vehicles. Naturally, this increase the manufacturer's cost and creates various inventory issues for the manufacturer and retailer or other supplier.

In order for a wheel chock for tandem wheeled vehicles to be effective, the wheel chock must have a mechanism that moves one or more block members into and out of frictional engagement with adjacent tires with sufficient force that the wheel chock will prevent movement of the vehicle. However, to be useable by the typical recreational vehicle user and others, the wheel chock must also be relatively simple and easy to operate, without requiring any substantial amount of force by the user or requiring him or her to get into an awkward position to engage or disengage the wheel chock. As such, what is needed is a wheel chock that has a mechanical linkage system which simply and easily, but effectively, locks one or more blocking members into and out of frictional engagement with the adjacent tires of a tandem wheeled vehicle. Preferably, an improved wheel chock avoids the use a threaded member or other screw device that are generally known to be time consuming, difficult to operate and require the user to get down to engage or disengage. In addition, a preferred wheel chock apparatus will avoid the use the compound lever systems that are known to be mechanically complex and tend to require excessive force to engage or disengage from the adjacent tires. A preferred wheel chock will prevent the known problem of the block members being essentially stuck between the tire and supporting surface, thereby requiring a generally uncomfortable amount of force or effort to disengage the block member from its locked position. The preferred wheel chock will also accommodate a wide variety of tandem wheel configurations, including a relatively wide range of spacing between adjacent wheels of the vehicle.

SUMMARY OF THE INVENTION

The wheel chock for tandem wheeled vehicles of the present invention provides the benefits and solves the problems identified above. That is to say, the present invention discloses a wheel chock which is relatively easy to use, simple to operate and can be operated without requiring the user to get into an uncomfortable position to engage or disengage the wheel chock from the vehicle's wheels. The wheel chock of the present invention utilizes a pair of horizontally, longitudinally moveable block members that are interconnected by a linkage system which utilizes an over-center lever mechanism to lockingly place the block members into a frictionally engaging relation with the pair of tires and the supporting surface so as to prevent rotational movement of the tires in relation to the supporting surface, thereby securing the vehicle in place. The wheel chock of the present invention is configured with a handle at one block member that can be pivotally raised or lowered by movement of the user's foot, if desired, to rotate a shaft connected to a link member which interconnects the shaft with the linkage mechanism so as to displace the other block member away from or towards the first block member to engage or disengage the wheel chock from the vehicle's tires. In one configuration, the wheel chock of the present invention is configured to stabilize the vehicle by preventing movement of the wheels relative to supporting surface. In another embodiment, the wheel chock of the present invention is configured to receive a lock device, such as a padlock or similar device, to prevent theft of the vehicle by preventing unauthorized persons from disengaging the wheel chock.

In one general aspect of the present invention, the wheel chock for use with tandem wheeled vehicles having a first wheel and a second wheel disposed on a supporting surface basically comprises a pair of generally wedged shaped block members, configured as a first block member and a second block member in spaced apart relation, that are interconnected by a linkage assembly which is operatively connected to a handle to horizontally displace the block members relative to each other. Each of the block members have a top side, a surface engaging bottom side, a first end, a second end, a first side wall and a second side wall. The first end of each block member has an angled contact panel that is configured for frictional engagement with the first and second wheels, respectively, of the vehicle to prevent rotation of the wheels and, therefore, movement of the vehicle. The linkage assembly is configured to generally displace the second block member either away from or towards the first block member in a generally horizontal relation to the supporting surface. The handle has a lever portion that is operated by the user and a handle shaft that is operatively connected to the linkage assembly such that pivoting of the handle will move the first block member and the second block member between the engaged, wheel locking condition to prevent movement of the vehicle and a disengaged condition to allow movement of the vehicle. The linkage assembly includes a link member which is configured for over-center displacement as a result of the movement of the handle so as to maintain the first block member and the second block member in an engaged condition. In the preferred embodiment of the present invention, the wheel chock also comprises a locking member that is received in the first block member and is configured to maintain the linkage assembly in the engaged condition. To prevent the angled panel from becoming stuck under the wheel, as is common with many other wedge configured members, the first ends of the block members of the wheel chock of the present invention includes a vertical panel and is configured at an angle that will not become easily stuck under the wheels. In a preferred embodiment the contact panels of the first and second block members is disposed at an angle of approximately 38 degrees to 45 degrees. The block members are preferably made out of injection molded plastic and the linkage materials are made out of steel or other strong, durable material. Alternatively, the block members can be made out of metals, such as aluminum or stainless steel, other plastics, fiberglass, composites or other materials.

Accordingly, the primary objective of the present invention is to provide a wheel chock for tandem wheeled vehicles that provides the advantages discussed above and that overcomes the disadvantages and limitations which are associated with presently available wheel chock apparatuses.

It is also an important objective of the present invention to provide a wheel chock for tandem wheeled vehicles that is substantially easy to operate and effective at lockingly engaging a pair of adjacent wheels of a vehicle so as to prevent undesirable or unauthorized movement thereof.

It is also an important objective of the present invention to provide a wheel chock for tandem wheeled vehicles that substantially prevents movement relative to a supporting surface by horizontally displacing one or more block members to a position between a tire of the vehicle and the supporting surface so as to lockingly engage the block member in frictional relation with the tire and the supporting surface.

It is also an important objective of the present invention to provide a wheel chock for tandem wheeled vehicles that comprises a pair of horizontally moveable block members having a wedge-shaped face for frictional engagement with the a pair of adjacent tires and a linkage assembly interconnecting the pair of block members and configured so as to maintain the block members in engagement with the tires to prevent movement of the vehicle.

It is also an important objective of the present invention to provide a wheel chock for tandem wheeled vehicles that comprises a first block member, a second block member, a linkage assembly interconnecting the first and second block members, a handle connected to an over-center lever mechanism and a locking member in cooperative arrangement with the linkage assembly so as to maintain the wheel chock in engagement with the a pair of adjacent tires.

It is also an important objective of the present invention to provide a wheel chock for tandem wheeled vehicles as set forth in the preceding object in which each of the block members has an angled contact face that is configured to facilitate engagement of the wheel lock with the vehicle's tires when locking is desired and disengagement when release of the wheel chock is desired.

It is also an important objective of the present invention to provide a wheel chock for tandem wheeled vehicles as set forth in the preceding object in which the contact face has an angled portion that is at an angle of approximately 38 degrees to 45 degrees and a substantially vertical portion that are configured to prevent the block members from becoming stuck under or against the vehicle's tires.

It is also an important objective of the present invention to provide a wheel chock for tandem wheeled vehicles that has block members which can be manufactured out of injection molded plastics or from other lightweight, strong materials so as to reduce the weight and cost of the wheel chock.

The above and other objectives of the present invention will be explained in greater detail by reference to the attached figures and the description of the preferred embodiment which follows. As set forth herein, the present invention resides in the novel features of form, construction, mode of operation and combination of processes presently described and understood by the claims.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, and particularly with reference to the embodiment of the wheel chock for tandem wheeled vehicles of the present invention illustrated in the figures, various preferred embodiments of the present invention are set forth below. The enclosed description and drawings are merely illustrative of one or more preferred embodiments and represent at least one of several different ways of configuring the present invention. Although specific components, materials, configurations and uses of the present invention are illustrated and set forth in this disclosure, it should be understood that a number of variations to the components and to the configuration of those components described herein and in the accompanying figures can be made without changing the scope and function of the invention set forth herein. For purposes of this disclosure, references are generally to use of the present invention with a recreational vehicle having a set of tandem wheels, however, it is understood that the disclosure herein applies to other like configured tandem wheeled vehicles and other vehicles having a pair of spaced apart, adjacent wheels.

Figure 1:
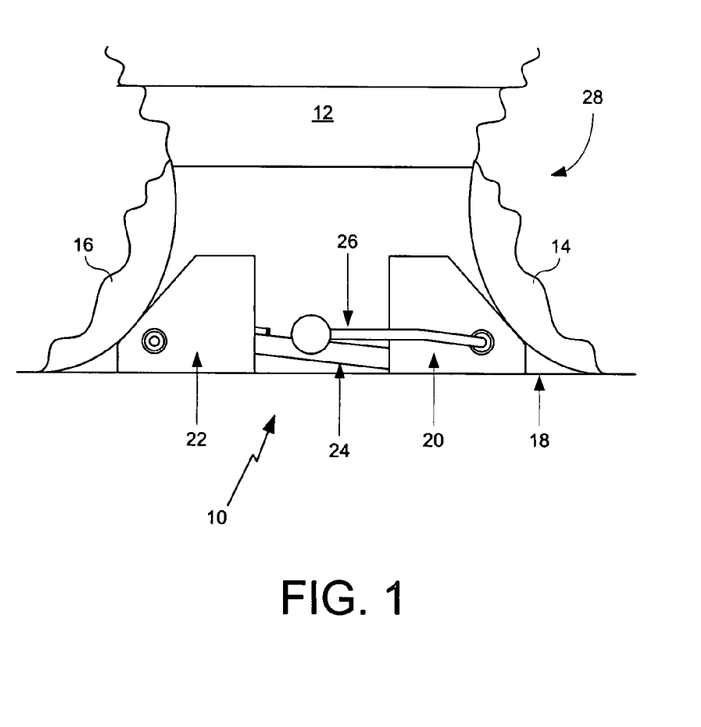
FIG. 1 is a side view of a wheel chock for tandem wheeled vehicles configured according to a preferred embodiment of the present invention shown in use in the locked or engaged position between a pair of adjacent tires.
Figure 2:
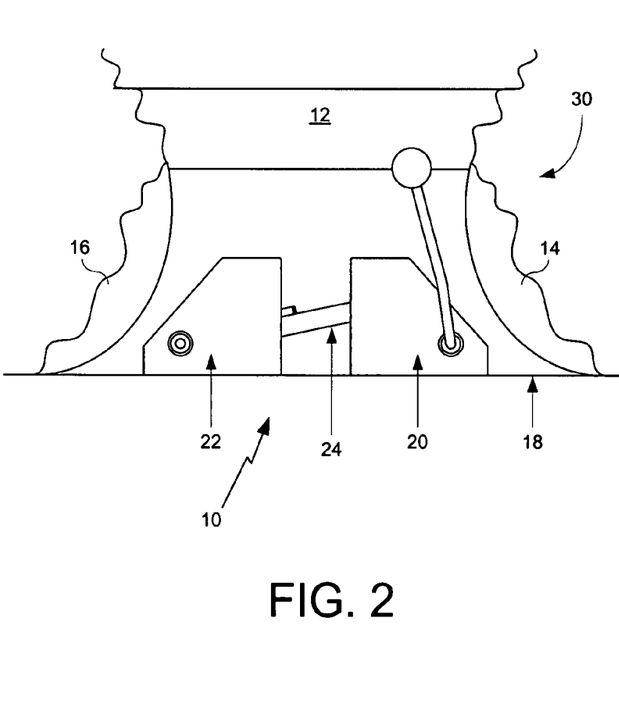
FIG. 2 is a side view of the wheel chock of FIG. 1 shown in use in the unlocked or disengaged position.

A wheel chock that is manufactured out of the components and configured pursuant to the concepts and principles of the present invention is shown generally as 10 in the figures. As shown in FIGS. 1 and 2, wheel chock 10 is configured for use with a vehicle 12 having a pair of spaced apart wheels each having pneumatic tires, such as first wheel 14 and second wheel 16, which are in contact with a supporting surface 18 such as the ground, a paved surface, concrete driveway or other like surfaces. In the preferred embodiment, wheel chock 10 generally comprises a pair of block members, shown as first block member 20 and second block member 22, a linkage assembly 24 interconnecting first 20 and second 22 block members, and a handle 26 operatively engaged with the linkage assembly 24 so as to cause first 20 and/or second 22 block members to move in a generally horizontally disposed manner relative to each other and supporting surface 18 to operatively engage or disengage from wheels 14 and 16, respectively. FIG. 1 shows handle 26 in its lower position which, as explained in more detail below, places wheel chock 10 in its engaged condition (shown as 28) by engaging first block member 20 with first wheel 14 and second block member 22 with second wheel 16 so as to prevent movement of vehicle 12 relative to supporting surface 18. FIG. 2 shows handle 26 in its raised position which places wheel chock 10 in its disengaged condition (shown as 30) by disengaging first block member 20 from first wheel 14 and second block member 22 from second wheel 16 to allow the user to remove wheel chock 10 from between wheels 14 and 16 and, if desired, movement of vehicle 12.

In the embodiment shown in the figures, first block member 20 and second block member 22 are configured substantially the same and disposed in opposite facing relation to move away or towards each other as desired for engaged condition 28 or disengaged condition 30. In the preferred embodiment, both first block member 20 and second block member 22 comprise a top side 32, an opposing surface engaging bottom side 34, a first end 36 having an angled contact panel 38 and a generally vertical panel 40, a generally open second end 42, a first side wall 44 and a generally parallel second side wall 46, all of which cooperate to form the generally wedge-shaped first 20 and second 22 block members. As shown in the figures, in the preferred configuration top side 32 is somewhat shorter in length than the generally planar bottom side 34 and vertical panel 40 is somewhat shorter in length then contact panel 38, which is configured to frictionally engage first wheel 14 or second wheel 16. In the preferred embodiment, top side 32 is of sufficient length to permit the user to place a portion of one of his or her feet on top side 32. Also in the preferred embodiment, vertical panel 40 is of sufficient height that first end 36 of first 20 and second 22 block members will not become wedged under first 14 and second 16 wheels to such an extent that it becomes difficult or is unduly difficult for the user to disengage first 20 and second 22 block members. Prior art devices generally utilize a wedge-shaped member that has the wedge side ending in a point or near pointed configuration which, as is well known, has the unfortunate tendency to become somewhat stuck under first 14 or second 16 wheel. This often requires the user to get down on or near the surface 18 and manually pull the wedge-shaped member out from under the wheel. To further prevent such occurrences, the present inventor has found that having contact panel angled in a range of approximately 38 degrees to 45 degrees, as measured from the vertical plane passing through vertical panel 40, is a beneficial configuration for first end 36. In one configuration, top side 32 is approximately two and one-half inches long, bottom side 34 is approximately six inches long, second end 42 is approximately five inches high, vertical panel 40 is approximately one and one-eighth an inch high and first 36 and second 42 ends are approximately four and one-half inches across. As will be recognized by those skilled in the art, the various sides, walls and panels of first 20 and second 22 block members can be made in a solid configuration, as shown, or can be provided in a non-solid (i.e., with openings therein) configuration. First block member 20 and second block member 22 can be manufactured out of a variety of different materials, including plastics, metals, composites, fiberglass and others. In the preferred embodiment, for ease of handling, corrosion resistance and strength, these components are made out of a lightweight, strong injection moldable plastic such as Zytel 8018 (Zytel is a trademark of E. I. duPont de Nemores & Co., Inc.).

Interconnecting first block member 20 and second block member 22 is linkage assembly 24. Linkage assembly 24 comprises link member 48 and, in the alternative embodiment of FIG. 6, drive member 50. Link member 48 is operatively connected to handle 26 at first block member 20 and to the first end 52 of drive member 50. The second end 54 of drive member 50 connects to second block member 22. As set forth in more detail below, the pivoting movement of handle 26 rotates link member 48 in a generally upward (for locking) or downward (for disengaging) direction to cause drive member 50 to push second block member 22 away from first block member 20 to place wheel chock 10 in the engaged condition 28 or to pull second block member 22 towards first block member 20 to place wheel chock 10 in the disengaged condition 30. In this embodiment, drive member 50 would have to be manufactured in a length that was appropriate for the particular spacing between the outer edges of first wheel 14 and second wheel 16 of vehicle 12. As will readily apparent to those skilled in the art, however, a problem with such a configuration is that the wheel chock 10 would have to be made in a number of different configurations for the variety of different vehicles 12 in use and the distance between first wheel 14 and second wheel 16 for a particular vehicle 12 could change as different sized tires are utilized. As a result, in the preferred embodiment, shown in FIGS. 3 through 5, drive member 50 comprises a first drive member 56, having a first end 58 and a second end 60, and a second drive member 62, having a first end 64 and second end 66. First end 58 of first drive member 56 connects to link member 48 at first block member 20 and second end 66 of second drive member 62 connects to second block member 22. In this configuration second end 60 of first drive member 56 connects to first end 64 of second drive member 62 in a manner that allows the user to set the overall length of combined first 56 and second 62 drive members to allow for the specific distance between the outer edges of first wheel 14 and second wheel 16 that is applicable to the user's particular vehicle 12. In the preferred embodiment, as shown, first drive member 56 and second drive member 62 telescopically connect and are secured in place by connecting mechanism 68, such as a bolt, screw, set screw or the like. In this manner, wheel chock 10 can be made to fit a wide range of distances between first 14 and second 16 wheel for a variety of different vehicles 12 and allow the user to utilize wheel chock 10 for different vehicles or as the span between first 14 and second 16 wheels change. Generally, once the user sets the relative span of first drive member 56 and second drive member 62 by securing connecting mechanism 68 in place, he or she will not have to reset the span for the same vehicle unless the size of first 14 and/or second 16 wheels change. Naturally, if wheel chock 10 is used on a different vehicle 12, then it may be necessary to loosen connecting mechanism 68 and reset it for the span of the new vehicle 12. Use of a set screw or similar device for connecting mechanism 68 provides a wide range of adjustments for the span between first 14 and second 16 wheels, as opposed to the limited range that results from the use of first 56 and second 62 drive members with a plurality of spaced holes for receiving a pin, bolt or other device therein (where it is necessary to align the holes to obtain the connection).

Figure 5:
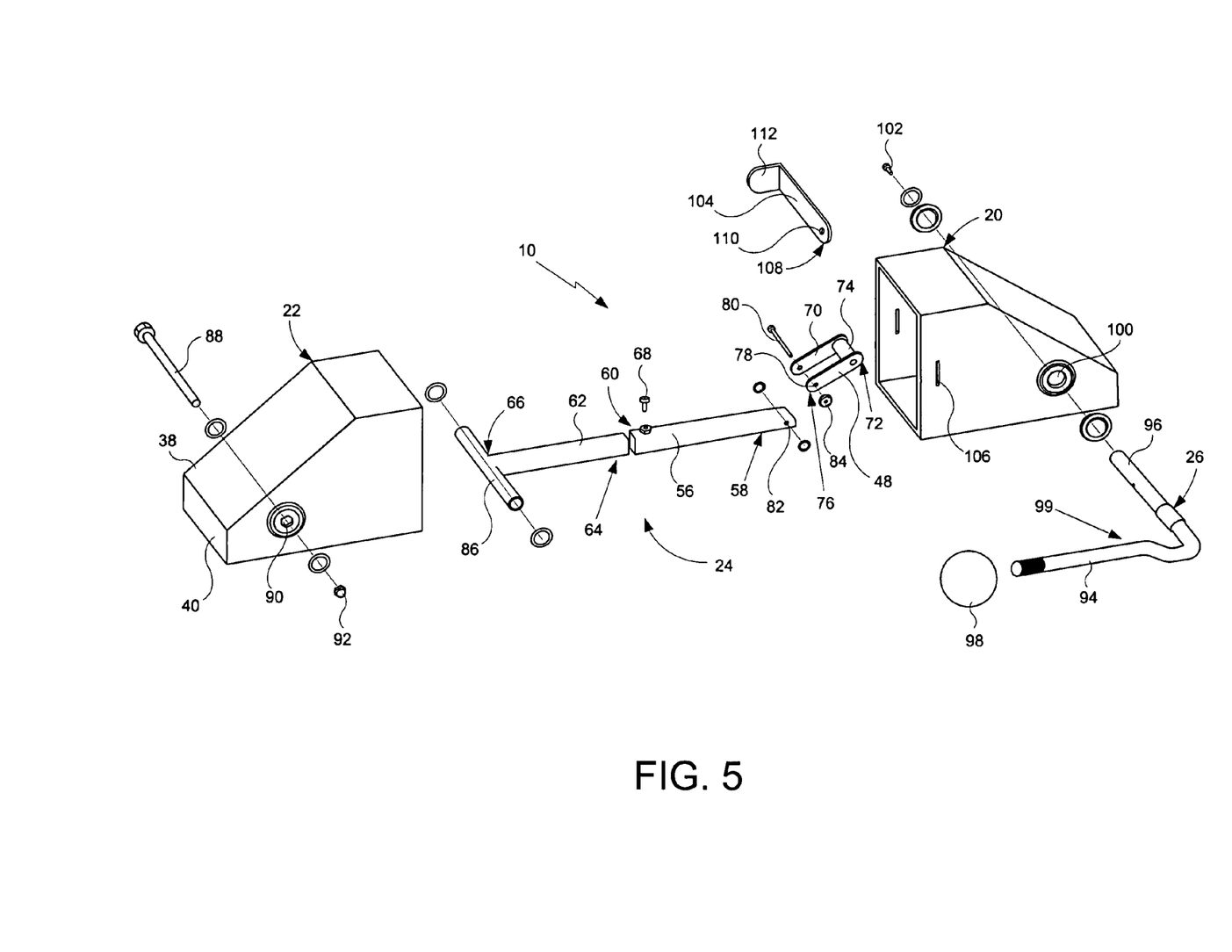
FIG. 5 is an exploded perspective view showing the various components of the embodiment of the wheel chock of FIG. 3.

As best shown in FIG. 5, link member 48 of the preferred embodiment comprises a pair of rigid, generally parallel spaced apart side plates 70 that are interconnected at the first end 72 thereof by a shaft engaging tube 74. As set forth below, shaft engaging tube 74 is configured to engagingly receive a portion of handle 26 so as to cause pivoting of link member 48 upon the pivoting of handle 26. The second ends 76 of side plates 70 are each provided with an aperture 78 configured to receive pivot pin 80 therein so as to interconnect second ends 76 of side plates 70, which form link member 48, to a cooperatively configured aperture 82 through the first end 58 of first drive member 56. In the embodiment shown in the figures, pivot pin 80 is the type that utilizes a cap nut 84 or similar attachment mechanism to secure pivot pin 80 in place through apertures 78 of link member 48 and aperture 82 of first drive member 56. As will be readily recognized by those skilled in the art, a variety of other connecting mechanism are suitable for use to pivotally connect link member 48 with drive member 50 or first drive member 56 such that when link member 48 is pivoted upward or downward it will drive the drive member 50 or combination first 56 and second 62 drive members in a generally linear direction so as to move second block member 22 away from or towards first block member 20.

As set forth above, the second end 54 of drive member 50 or, in the preferred embodiment, the second end 66 of second drive member 62 connects to second block member 22 to facilitate the movement thereof upon the pivoting of link member 48. In the preferred embodiment, shown in FIGS. 4 through 6, the second end 54 of drive member 50 or the second end 66 of drive member 62 has a pin receiving tube 86 integrally formed therewith for receiving connecting pin 88 that is configured to be journaled in opposing apertures 90 in second block member 22. Connecting pin 88 is configured to be received through apertures 90 in second block member 22 and through pin receiving tube 86 and then secured in place with a cap nut 92 or like device. In this configuration, with pin receiving tube 86 appropriately sized and configured, drive member 50 or second drive member 62 will be substantially centered in second block member 22 with little or no lateral movement inside second block member 22. As will be recognized by those skilled in the art, various other configurations can be used to connect drive member 50 or second drive member 62 to second block member 22. For instance, the second end 54 of drive member 50 or the second end 66 of second drive member 62 can be configured with an aperture that cooperatively engages a drive member mounting mechanism (not shown) disposed inside of second block member 22 to achieve the same stable configuration as that shown in the figures. Various other configurations are also possible.

Figure 3:
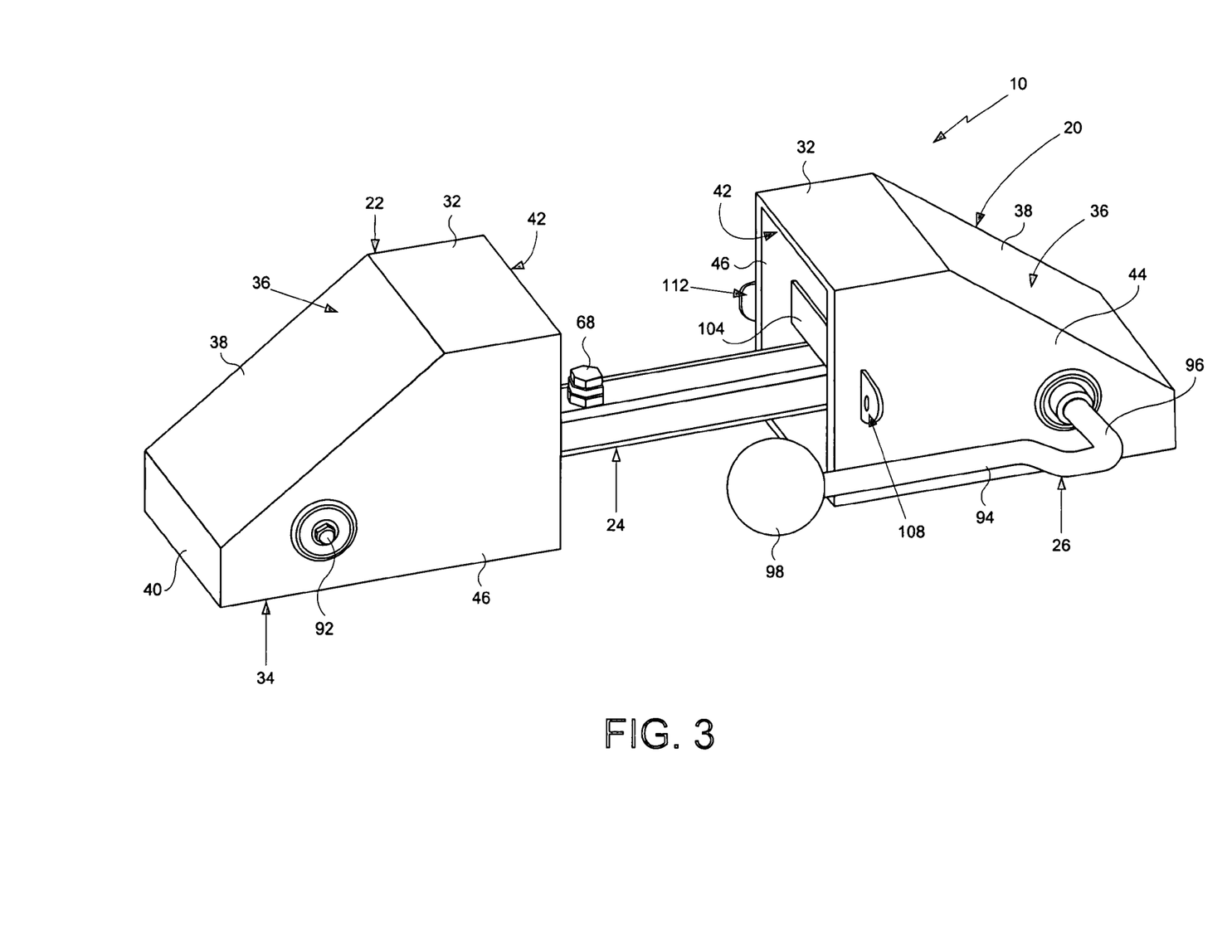
FIG. 3 is a side perspective view of the wheel chock of FIG. 1.

As best shown in FIGS. 3 and 5, handle 26 is pivotally connected to first block member 20. In the preferred embodiment, handle 26 comprises lever 94 and handle shaft 96. Lever 94 is configured for the user to pivotally raise or lower so as to place wheel chock 10 in either the engaged condition 28 or the disengaged condition 30, as shown in FIGS. 1 and 2, respectively. For the convenience of the user, threadably attached at the end of lever 94 is knob 98. As known in the art, knob 98 can be used or not used and, if used, can attach to lever 94 in a variety of different manners or be made integrally with lever 94. In the preferred embodiment, lever 94 includes a bent section, shown at 99 in FIG. 5, that raises the remaining portion of lever 94 slightly to allow the user to place his or her foot under lever 94 and rotate handle 26 without having to bend over and utilize his or her hands to raise handle 26 to displace second block member 22 away from second wheel 16 so as to place wheel chock in the disengaged condition. Handle shaft 96 is configured to be received through shaft aperture 100 in the first 44 and second 46 side walls and secured at the end thereof by shaft connector 102. Handle shaft 96 is also configured to be received in shaft engaging tube 74 such that the rotation of handle shaft 96 from the pivoting of lever 94 will result in the pivoting of link member 48, which will displace second block member 22 either away from or towards first block member 20 to place wheel chock 10 in the engaged condition 28 or the disengaged condition 30 of FIGS. 1 and 2. To accomplish this handle shaft 96 and shaft engaging tube 74 are cooperatively configured to engage handle shaft 96 in shaft engaging tube 74. In the configuration shown in FIG. 5, handle shaft 96 and shaft engaging tube 74 are each provided with a shaft/tube engaging mechanism to fix the rotation of handle shaft 96 to the pivoting of link member 48. As well known in the art, various other mechanisms can be used to fix the rotation of handle shaft 96 with the pivot action of link member 48 so as to horizontally displace second block member 22.

Figure 4:
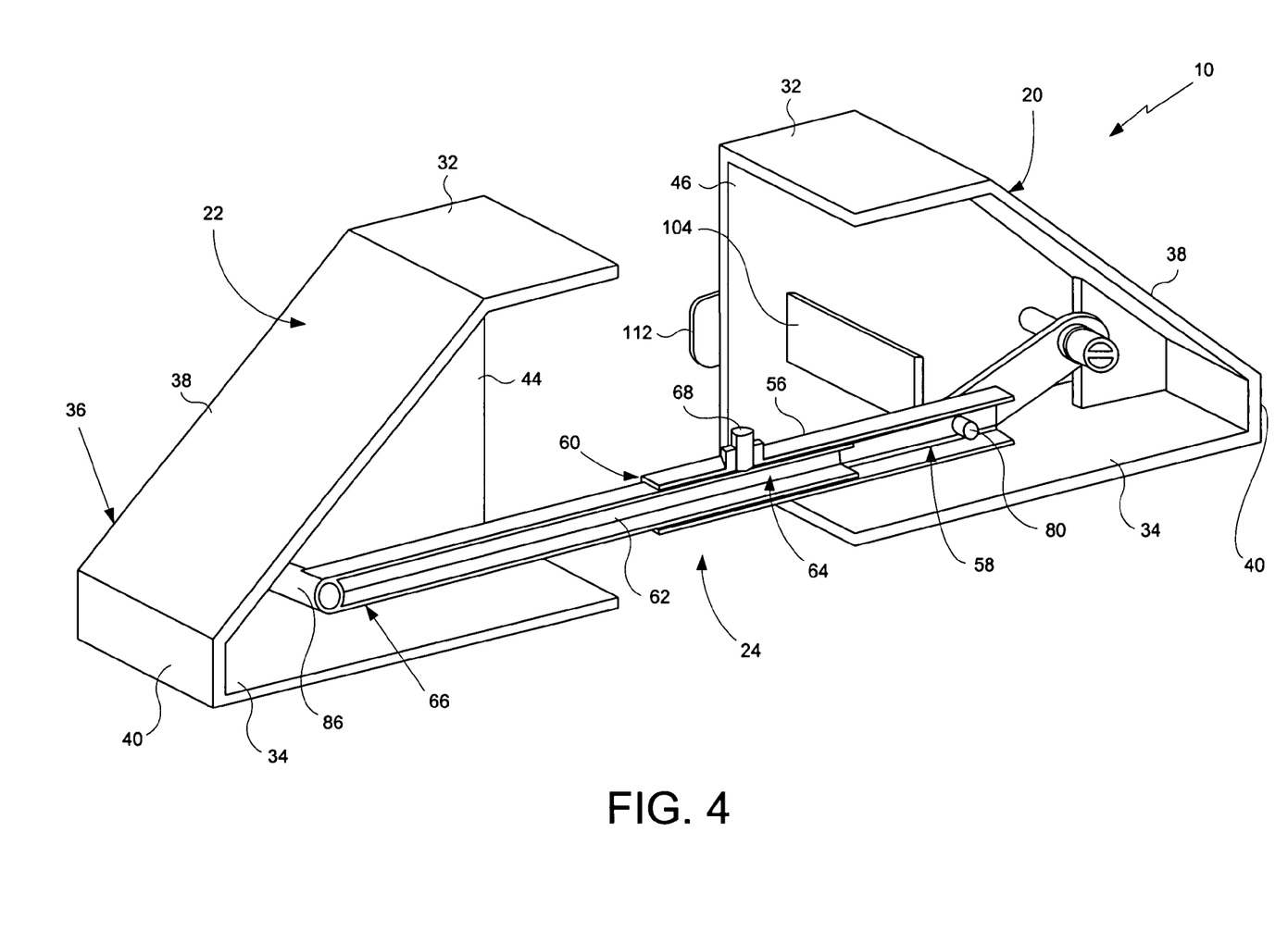
FIG. 4 is a sectional view of the wheel chock of FIG. 3 particularly illustrating a preferred embodiment of the linkage mechanism thereof.
Figure 6:
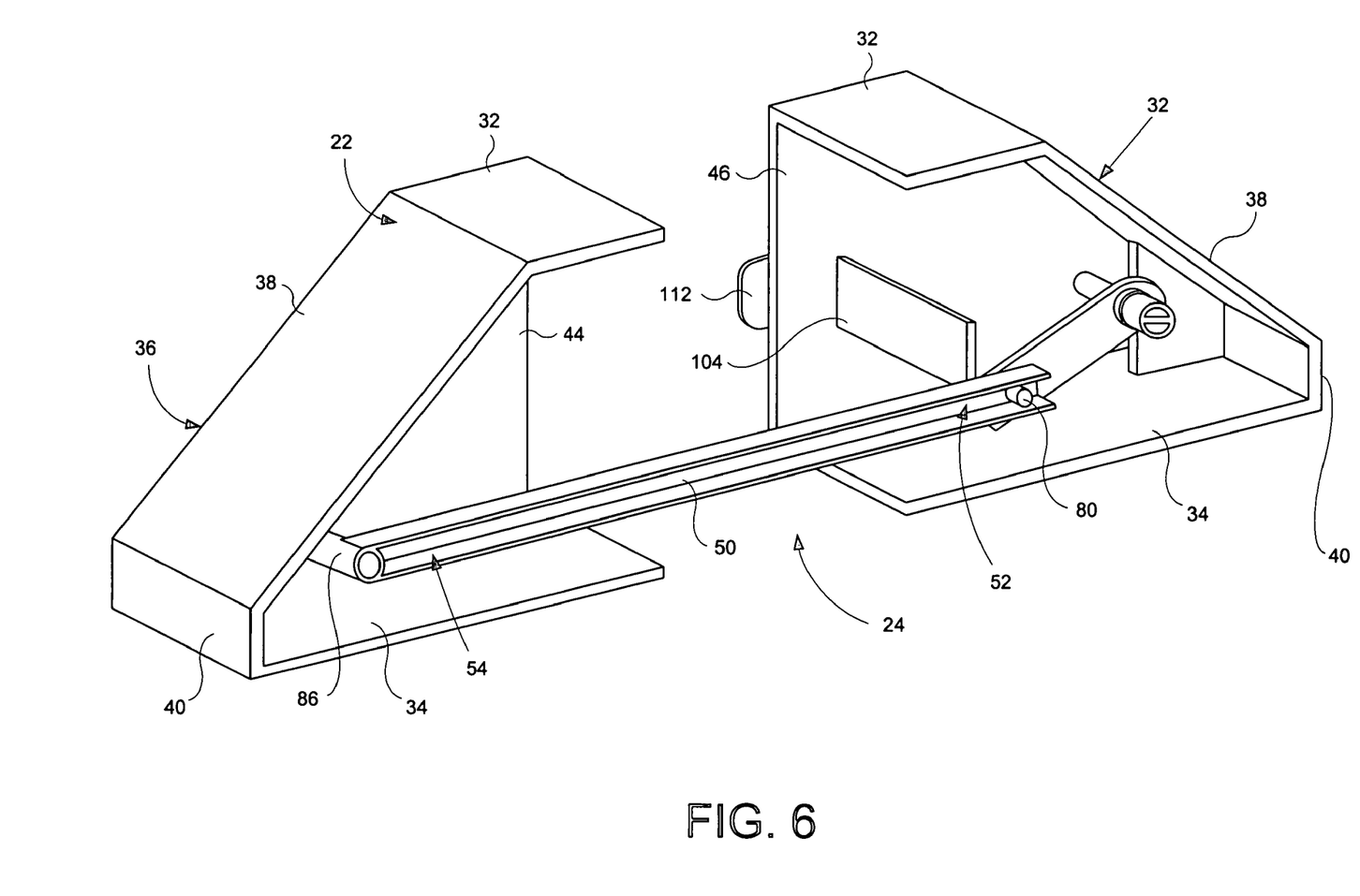
FIG. 6 is a sectional view of an alternative embodiment of the wheel chock of the present invention utilizing a single piece drive member to interconnect the pair of block members.

To maintain wheel chock 10 in the engaged condition 28 when it is desired to prevent movement of vehicle 10, the preferred embodiment includes the use of a cam-like mechanism such that the downward rotation of handle shaft 96, from the downward pivoting of lever 94, results in link member 48 of linkage assembly 24 having an over-center displacement, as best shown in FIGS. 4 and 6. As will be recognized by those skilled in the art, the over-center displacement of link member 48 will prevent it from being easily pivoted upward by pressure applied to second block member 22, which could come from second wheel 16 or other outside forces. With link member 48 angled downward when wheel chock 10 is in the engaged condition 28, upward pivoting action of handle 26 will be required to allow movement of second block member 22 towards first block member 20 to place wheel chock 10 in the disengaged condition 30. The preferred embodiment of wheel chock 10 of the present invention also includes locking member 104 at first block member 20 that is configured to prevent upward movement of linkage assembly 24 while wheel lock 10 is in the engaged condition 28. As best shown in FIG. 5, in the embodiment locking member 104 is received through locking slots 106 on the first 44 and second 46 side walls of first block member 20. Locking member 104 and locking slots 106 are cooperatively configured to substantially engage locking member 104 in locking slots 106 so that it will not easily become disengaged. In the preferred embodiment of locking member 104, the first end 108 thereof is provided with a locking aperture 110 in which a lock, such as a padlock or the like, or other securing mechanism can be received therein to fixedly secure locking member 104 in place and prevent any unauthorized movement of handle 26 to place wheel lock 10 in the disengaged condition 30. As shown, the second end 112 of locking member 104 should be configured to prevent locking member 104 from passing completely through locking slots 106 and, thereby releasing linkage assembly 24 and permitting wheel chock 10 to be placed in the disengaged condition 30. In the embodiment shown, second end 112 is bent at an angle the prevents it from passing through the locking slot 106 on the second side wall 46 of first block member 20. If wheel lock 10 of the present invention is utilized to prevent theft of vehicle 12, it may also be necessary to configure the telescoping configuration of first drive member 56 and second drive member 62 so that a person cannot merely remove connecting mechanism 68 and separate first drive member 56 from second drive member 62.

In use, once vehicle 12 is placed in a parked condition, wheel chock 10 is placed between two substantially adjacent, such as tandem wheels, of vehicle 12 such that first block member 20 is substantially abutting first wheel 14. The user then merely pivots the lever 94 of handle 26 downward, causing handle shaft 96 to rotate and pivot link member 48 downward towards the bottom side 34 of first block member 20. This downward pivoting of link member 48 will cause drive member 50 or the combination of first drive member 56 and second drive member 62 to displace second block member 22 away from first block member 20 and in engagement with second wheel 16. The full motion of handle 26 will cause first block member 20 and second block member 22 to tightly abut first wheel 14 and second wheel 16, respectively, and move link member 48 into the over-center displacement, as shown in FIGS. 4 and 6, thereby placing wheel chock 10 in the engaged condition 28. The pivoting of handle 26 can be accomplished by the user's foot or, if desired, his or her hand. Once wheel chock 10 is in the engaged condition 28, the user can slide the first end 108 of locking member 104 through the locking slots 106 on first block member 20 until the first end 108 of locking member 104 extends sufficiently through the locking slots 106 on the first side wall 44 of first block member 20 to secure locking member 104 in first block member 20 and prevent any upward movement of linkage assembly 24 that could prematurely release second block member 22 from engagement with second wheel 16. If desired, a lock device or other securing mechanism can be placed through locking aperture 110 to secure locking member 104 to first block member 20. To place wheel chock in the disengaged condition 30, the user removes locking member 104 from first block member 20 and then uses his or her foot, or if preferred his or her hand, to pivot handle 26 upward. This will cause handle shaft 96 to rotate and pivot link member 48 upward, pulling second block member 22 towards first block member 20 and disengaging second block member 22 from the abutting relation with second wheel 16. Wheel chock 10 can then be removed from between first 14 and second 16 wheels to allow movement of vehicle 12.

While there are shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape, and use. For instance, there are numerous components described herein that can be replaced with equivalent functioning components to accomplish the objectives of the present invention.

What is claimed is:

1. A wheel chock for a tandem wheeled vehicle having a first wheel and a second wheel disposed on a supporting surface, said wheel chock comprising:
   a first block member having a top side, a surface engaging bottom side, a first end and a second end, said first end having an angled contact panel configured for frictional engagement with said first wheel;
   a second block member in spaced apart relation to said first block member, said second block member having a top side, a surface engaging bottom side, a first end and a second end;
   a linkage assembly interconnecting said first block member and said second block member, said linkage assembly configured to generally displace said second block member in generally horizontal relation to said supporting surface and away from said first block member into abutting engagement with said second wheel for placement of said wheel chock into an engaged condition;
   a handle pivotally connected to said first block member and operatively connected to said linkage assembly to move said first block member and said second block member between said engaged condition having said first block member against said first wheel and said second block member against said second wheel so as to prevent movement of said vehicle and a disengaged condition having said second block member moved away from said second wheel so as to allow movement of said vehicle; and
   a locking member at said first block member, said locking member received through one or more locking slots in said first block member and into operative engagement with said linkage assembly so as to maintain said linkage assembly in said engaged condition.

2. The wheel chock of according to claim 1, wherein said linkage assembly includes a link member configured for over-center displacement so as to maintain said first block member and said second block member in an engaged condition.

3. The wheel chock of according to claim 2, wherein said link member is rotatably connected to said first block member and operatively engaged with said handle so as to rotate with rotation of said handle.

4. The wheel chock of according to claim 3, wherein said linkage assembly further comprises a drive member having a first end and a second end, said first end of said drive member pivotally connected to said link member, said second end of said drive member pivotally connected to said second block member.

5. The wheel chock of according to claim 4, wherein said drive member comprises a first drive member, a second drive member telescopically received in said first drive member and a means for securely connecting said first drive member and said second drive member so as to fix the position of said first drive member relative to said second drive member.

6. The wheel chock of according to claim 2, wherein said first block member further comprises a first side wall and a second side wall and said second block member further comprises a first side wall and a second side wall, said link member rotatably connected to at least one of said first side wall and said second side wall of said first block member.

7. The wheel chock of according to claim 1, wherein said first end of said second block member has an angled contact panel, said contact panel of said second block member configured for frictional engagement with said second wheel.

8. The wheel chock of according to claim 7, wherein each of said contact panel of said first block member and said contact panel of said second block member are disposed at an angle of approximately 38 degrees to 45 degrees.

9. The wheel chock of according to claim 1, wherein said first end of said first block member further comprises a vertical panel.

10. The wheel chock of according to claim 9, wherein said first end of said second block member further comprises an angled contact panel and a vertical panel, said contact panel of said second block member configured for frictional engagement with said second wheel.

11. The wheel chock of according to claim 1, wherein said first block member further comprises a first side wall and a second side wall and said second block member further comprises a first side wall and a second side wall, at least one of said locking slots disposed in each of said first side wall and said second side wall of said first block member, said locking member extending between said locking slots in said first side wall and said second side wall of said first block member.

12. A wheel chock for a tandem wheeled vehicle having a first wheel and a second wheel disposed on a supporting surface, said wheel chock comprising:

a first block member having a top side, a surface engaging bottom side, a first end, a second end, a first side wall and a second side wall, said first end having an angled contact panel and a vertical panel, said contact panel of said first block member configured for frictional engagement with said first wheel;

a second block member in spaced apart relation to said first block member, said second block member having a top side, a surface engaging bottom side, a first end, a second end, a first side wall and a second side wall, said first end of said second block member having an angled contact panel and a vertical panel, said contact panel of said second block member configured for frictional engagement with said second wheel;

a linkage assembly interconnecting said first block member and said second block member, said linkage assembly configured to generally displace said second block member in generally horizontal relation to said supporting surface and away from said first block member into abutting engagement with said second wheel for placement of said wheel chock into an engaged condition, said linkage assembly having a link member configured for over-center displacement so as to maintain said first block member and said second block member in said engaged condition;

a handle operatively connected to said linkage assembly and configured to move said first block member and said second block member between said engaged condition having said first block member against said first wheel and said second block member against said second wheel so as to prevent movement of said vehicle and a disengaged condition having said second block member moved away from said second wheel so as to allow movement of said vehicle; and a locking member at said first block member, said locking member received through one or more locking slots in said first block member and into operative engagement with said linkage assembly so as to maintain said linkage assembly in said engaged condition.

13. The wheel chock of according to claim 12, wherein said link member is rotatably connected to said first block member and operatively engaged with said handle so as to rotate with rotation of said handle.

14. The wheel chock of according to claim 13, wherein said linkage assembly further comprises a drive member having a first end and a second end, said first end of said drive member pivotally connected to said link member, said second end of said drive member pivotally connected to said second block member.

15. The wheel chock of according to claim 14, wherein said drive member comprises a first drive member, a second drive member telescopically received in said first drive member and a means for securely connecting said first drive member and said second drive member so as to fix the position of said first drive member relative to said second drive member.

16. The wheel chock of according to claim 12, wherein each of said contact panel of said first block member and said contact panel of said second block member are disposed at an angle of approximately 38 degrees to 45 degrees.

17. A wheel chock for a tandem wheeled vehicle having a first wheel and a second wheel disposed on a supporting surface, said wheel chock comprising:

a first block member having a top side, a surface engaging bottom side, a first end, a second end, a first side wall and a second side wall, said first end having an angled contact panel and a vertical panel, said contact panel of said first block member configured for frictional engagement with said first wheel;

a second block member in spaced apart relation to said first block member, said second block member having a top side, a surface engaging bottom side, a first end, a second end, a first side wall and a second side wall, said first end of said second block member having an angled contact panel and a vertical panel, said contact panel of said second block member configured for frictional engagement with said second wheel;

a linkage assembly interconnecting said first block member and said second block member, said linkage assembly configured to generally displace said second block member in generally horizontal relation to said supporting surface and away from said first block member into abutting engagement with said second wheel for placement of said wheel chock into an engaged condition, said linkage assembly having a link member configured for over-center displacement so as to maintain said first block member and said second block member in said engaged condition, said link member rotatably connected to said first block member, said linkage assembly further comprising a first drive member, a second drive member telescopically received in said first drive member and a means for securely connecting said first drive member and said second drive member so as to fix the position of said first drive member relative to said second drive member, said first drive member pivotally connected to said link member, said second drive member pivotally connected to said second block member;

a handle operatively connected to said linkage assembly and configured to move said first block member and said second block member between said engaged condition having said first block member against said first wheel and said second block member against said second wheel so as to prevent movement of said vehicle and a disengaged condition having said second block member moved away from said second wheel so as to allow movement of said vehicle; and a locking member at said first block member, said locking member received through one or more locking slots in said first block member so as to maintain said linkage assembly in said engaged condition.

18. The wheel chock of according to claim 17, wherein each of said contact panel of said first block member and said contact panel of said second block member are disposed at an angle of approximately 38 degrees to 45 degrees.

* * * * *